(12) United States Patent
Wang et al.

(10) Patent No.: US 7,948,959 B2
(45) Date of Patent: May 24, 2011

(54) LINEAR PRECODING FOR TIME DIVISION DUPLEX SYSTEM

(75) Inventors: Jibing Wang, San Diego, CA (US);
Tamer Kadous, San Diego, CA (US);
Gwendolyn D. Barriac, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 958 days.

(21) Appl. No.: 11/552,960

(22) Filed: Oct. 25, 2006

(65) Prior Publication Data

US 2007/0115909 A1 May 24, 2007

Related U.S. Application Data

(60) Provisional application No. 60/731,027, filed on Oct. 27, 2005.

(51) Int. Cl.
*H04B 7/216* (2006.01)
*H04B 7/185* (2006.01)
*H04M 1/00* (2006.01)
*H04L 27/00* (2006.01)

(52) U.S. Cl. ............ 370/342; 455/13.3; 455/562.1; 375/299

(58) Field of Classification Search .......... 370/278, 370/280, 282, 294, 332, 334, 343; 375/259, 375/260, 267
See application file for complete search history.

(56) References Cited

U.S. PATENT DOCUMENTS

| 7,676,007 | B1* | 3/2010 | Choi et al. ............ 375/347 |
| 2003/0185309 | A1* | 10/2003 | Pautler et al. ........ 375/257 |
| 2005/0041750 | A1 | 2/2005 | Lau |
| 2005/0249302 | A1* | 11/2005 | Leshem et al. ....... 375/267 |
| 2006/0092054 | A1* | 5/2006 | Li et al. ............... 341/67 |
| 2006/0155534 | A1* | 7/2006 | Lin et al. ............. 704/223 |
| 2007/0086540 | A1* | 4/2007 | Chae et al. .......... 375/267 |
| 2007/0211813 | A1* | 9/2007 | Talwar et al. ....... 375/267 |
| 2009/0129501 | A1* | 5/2009 | Mehta et al. ......... 375/299 |

FOREIGN PATENT DOCUMENTS

| RU | 2216862 | 11/2003 |
| RU | 2329604 | 7/2008 |
| WO | 0241524 A | 5/2002 |
| WO | 02082689 A2 | 10/2002 |

OTHER PUBLICATIONS

Multiple Antenna Channels with Partial Feedback June Chul Roh and Bhaskar D. Rao Dept. of Electrical and Computer Engineering copyright 2003.*

(Continued)

*Primary Examiner* — Dwayne D Bost
*Assistant Examiner* — Michael Mapa
(74) *Attorney, Agent, or Firm* — Milan Patel; Raphael Freiwirth

(57) ABSTRACT

Systems and methodologies are described that facilitate generating and/or utilizing explicit and implicit feedback related to a forward link channel for linear precoding in a time division duplex (TDD) multiple-input multiple-output (MIMO) system. Implicit feedback may be provided by estimating a reverse link channel, which may be substantially similar to at least a portion of the forward link channel (e.g., based upon reciprocity). Moreover, explicit feedback may be yielded by quantizing at least part of an estimate of the forward link channel (e.g., utilizing vector and/or scalar quantization).

38 Claims, 12 Drawing Sheets

OTHER PUBLICATIONS

Barriac G. et al., "Wideband Space-Time Communciaiton: From Propagation-Based Models to Information-Theoretic Design Prescriptions," Signal Processing and Communications, 2004. SPCOM '40, 2004 International Conference on Bangalore, India Dec. 11-14, 2004, Piscataway, NJ, USA, IEEE Dec. 11, 2004, pp. 6-10, XP010810181, ISBN: 0-7803-8674-4.

Berenguer, B. et al.; "Linear precoding versus linear multiuser detection in the downlink of TDD-CDMA systems," IEEE Transactions on Wireless Communications, vol. 6, No. 3, Mar. 2007, pp. 780-786 Line 4 of ABSTRACT.

* cited by examiner

LINEAR PRECODING FOR TIME DIVISION DUPLEX SYSTEM

CROSS-REFERENCE TO RELATED APPLICATIONS

This application claims the benefit of U.S. Provisional Patent application Ser. No. 60/731,027 entitled "A METHOD AND APPARATUS FOR LINEAR PRE-CODING FOR TIME DIVISION DUPLEX SYSTEM" which was filed Oct. 27, 2005. The entirety of the aforementioned application is herein incorporated by reference.

BACKGROUND

I. Field

The following description relates generally to wireless communications, and more particularly to linear precoding in a time division duplex (TDD) wireless communication system.

II. Background

Wireless communication systems are widely deployed to provide various types of communication content such as, for example, voice, data, and so on. Typical wireless communication systems may be multiple-access systems capable of supporting communication with multiple users by sharing available system resources (e.g., bandwidth, transmit power, ... ). Examples of such multiple-access systems may include code division multiple access (CDMA) systems, time division multiple access (TDMA) systems, frequency division multiple access (FDMA) systems, orthogonal frequency division multiple access (OFDMA) systems, and the like.

Generally, wireless multiple-access communication systems may simultaneously support communication for multiple mobile devices. Each mobile device may communicate with one or more base stations via transmissions on forward and reverse links. The forward link (or downlink) refers to the communication link from base stations to mobile devices, and the reverse link (or uplink) refers to the communication link from mobile devices to base stations. Further, communications between mobile devices and base stations may be established via single-input single-output (SISO) systems, multiple-input single-output (MISO) systems, multiple-input multiple-output (MIMO) systems, and so forth.

MIMO systems commonly employ multiple ($N_T$) transmit antennas and multiple ($N_R$) receive antennas for data transmission. A MIMO channel formed by the $N_T$ transmit and $N_R$ receive antennas may be decomposed into $N_S$ independent channels, which may be referred to as spatial channels, where $N_S \leq \{N_T, N_R\}$. Each of the $N_S$ independent channels correspond to a dimension. Moreover, MIMO systems may provide improved performance (e.g., increased spectral efficiency, higher throughput and/or greater reliability) if the additional dimensionalities created by the multiple transmit and received antennas are utilized.

MIMO systems may support various duplexing techniques to divide forward and reverse link communications over a common physical medium. For instance, frequency division duplex (FDD) systems may utilize disparate frequency regions for forward and reverse link communications. Further, in time division duplex (TDD) systems, forward and reverse link communications may employ a common frequency region. However, conventional techniques may provide limited or no feedback related to channel information.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one ore more embodiments in a simplified form as a prelude to the more detailed description that is presented later.

In accordance with one or more embodiments and corresponding disclosure thereof, various aspects are described in connection facilitating generation and/or utilization of explicit and implicit feedback related to a forward link channel for linear precoding in a time division duplex (TDD) multiple-input multiple-output (MIMO) system. Implicit feedback may be provided by estimating a reverse link channel, which may be substantially similar to at least a portion of the forward link channel (e.g., based upon reciprocity). Moreover, explicit feedback may be yielded by quantizing at least part of an estimate of the forward link channel (e.g., utilizing vector and/or scalar quantization).

According to related aspects, a method that facilitates generating feedback related to a forward link channel for linear precoding is described herein. The method may comprise estimating a forward link channel to generate a matrix. Further, the method may include quantizing a portion of the matrix to yield explicit feedback. The method may also include transmitting quantized data over a reverse link channel that provides implicit feedback corresponding to a remainder of the matrix.

Another aspect relates to a wireless communications apparatus that may include a memory that retains a codebook and an estimated matrix related to a forward link channel. Further, the wireless communications apparatus may include a processor, coupled to the memory, configured to modify the codebook based at least in part upon one or more links employed for communicating via a reverse link channel, compare a portion of the estimated matrix to altered matrices in the modified codebook to select a closest altered matrix, and transmit an index associated with the selected, closest altered matrix over the reverse link channel.

Yet another aspect relates to a wireless communications apparatus for generating and transferring implicit and explicit feedback related to a forward link channel. The wireless communications apparatus may include means for estimating a forward link channel to yield a matrix; means for quantizing a subset of the matrix; and means for transmitting quantized data over a reverse link channel that provides implicit feedback related to a remainder of the matrix.

Still another aspect relates to a machine-readable medium having stored thereon machine-executable instructions for estimating a forward link channel and generating a unitary matrix associated with the forward link channel. The machine-readable medium may further have stored thereon machine-executable instructions for quantizing a portion of the unitary matrix that corresponds to one or more antennas of a mobile device that are inactive for reverse link channel communication and transmitting the quantized data over the reverse link channel, the reverse link channel provides implicit feedback corresponding to one or more links associated with one or more active antennas of the mobile device.

In accordance with another aspect, an apparatus in a wireless communication system may include a processor, wherein the processor may be configured to generate a matrix related to an estimated forward link channel. Further, the processor may be configured to quantize a portion of the matrix to yield explicit feedback related to part of the estimated forward link channel. Moreover, the processor may be configured to transmit quantized data over a reverse link channel, the reverse link channel provides implicit feedback related to a remainder of the estimated forward link channel.

According to a further aspect, a method that facilitates utilizing implicit and explicit feedback related to a forward link channel for linear precoding is described herein. The method may comprise estimating a reverse link channel to obtain implicit feedback related to a portion of a forward link channel. Additionally, the method may include evaluating explicit feedback related to a remainder of the forward link channel received via the reverse link channel. Further, the method may comprise combining the explicit feedback and the implicit feedback. Moreover, the method may include modifying communication over the forward link channel utilizing the combined feedback.

Another aspect relates to a wireless communications apparatus that may include a memory that retains a codebook and an index associated with the codebook received over a reverse link channel. Further, the wireless communications apparatus may include a processor, coupled to the memory, that may be configured to modify the codebook based at least in part upon one or more links utilized for communication via the reverse link channel, determine an adapted matrix from the modified codebook related to the index, and combine explicit feedback associated with the adapted matrix with implicit feedback estimated from the reverse link channel.

Still another aspect relates to a wireless communications apparatus for utilizing implicit and explicit feedback related to a forward link channel to modify subsequent transmission over the forward link channel. The wireless communications apparatus may include means for obtaining implicit feedback received via a reverse link channel, means for an analyzing explicit feedback received via the reverse link channel, and means for modifying communication over a forward link channel based upon a combination of the implicit feedback and the explicit feedback.

Yet another aspect relates to a machine-readable medium having stored thereon machine-executable instructions for estimating a reverse link channel to obtain implicit feedback corresponding to a portion of a forward link channel; analyzing explicit feedback received via the reverse link channel, the explicit feedback corresponds to the remainder of the forward link channel; and employing a combination of the implicit feedback and the explicit feedback to modify communication over the forward link channel.

In accordance with another aspect, an apparatus in a wireless communication system may include a processor, wherein the processor may be configured to estimate a reverse link channel to determine implicit feedback related to a portion of a forward link channel, evaluate explicit feedback related to a remainder of the forward link channel received via the reverse link channel, and combine the implicit feedback and the explicit feedback.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

Figure 1:
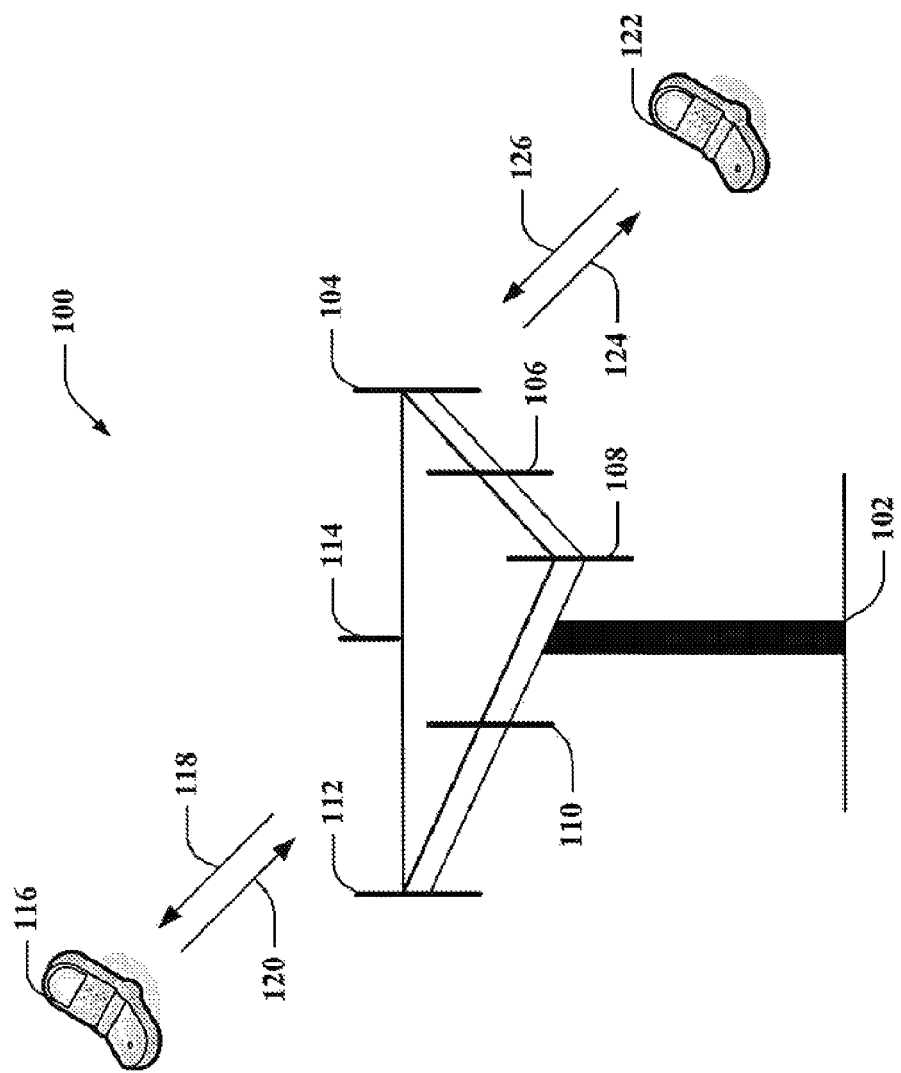
FIG. 1 is an illustration of a wireless communication system in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

As used in this application, the terms "component," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these component can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with a mobile device. A mobile device can also be called a system, subscriber unit, subscriber station, mobile station, mobile, remote station, remote terminal, access terminal, user terminal, terminal, wireless communication device, user agent, user device, or user equipment (UE). A mobile device may be a cellular telephone, a cordless telephone, a Session Initiation Protocol (SIP) phone, a wireless local loop (WLL) station, a personal digital assistant (PDA), a handheld device having a wireless connection capability, computing device, or other processing device connected to a wireless modem. Moreover, various embodiments are described herein in connection with a base station. A base station may be utilized for communicating with mobile device(s) and may also be referred to as an access point, Node B, or some other terminology.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

Referring now to FIG. 1, a wireless communication system 100 is illustrated in accordance with various embodiments presented herein. System 100 comprises a base station 102 that may include multiple antenna groups. For example, one antenna group may include antennas 104 and 106, another group may comprise antennas 108 and 110, and an additional group may include antennas 112 and 114. Two antennas are illustrated for each antenna group; however, more or fewer antennas may be utilized for each group. Base station 102 may additional include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 may communicate with one or more mobile devices such as mobile device 116 and mobile device 122; however, it is to be appreciated that base station 102 may communicate with substantially any number of mobile devices similar to mobile devices 116 and 122. Mobile devices 116 and 122 can be, for example, cellular phones, smart phones, laptops, handheld communication devices, handheld computing devices, satellite radios, global positioning systems, PDAs, and/or any other suitable device for communicating over wireless communication system 100. As depicted, mobile device 116 is in communication with antennas 112 and 114, where antennas 112 and 114 transmit information to mobile device 116 over a forward link 118 and receive information from mobile device 116 over a reverse link 120. Moreover, mobile device 122 is in communication with antennas 104 and 106, where antennas 104 and 106 transmit information to mobile device 122 over a forward link 124 and receive information from mobile device 122 over a reverse link 126. In a frequency division duplex (FDD) system, forward link 118 may utilize a different frequency band than that used by reverse link 120, and forward link 124 may employ a different frequency band than that employed by reverse link 126, for example. Further, in a time division duplex (TDD) system, forward link 118 and reverse link 120 may utilize a common frequency band and forward link 124 and reverse link 126 may utilize a common frequency band.

Each group of antennas and/or the area in which they are designated to communicate may be referred to as a sector of base station 102. For example, antenna groups may be designed to communicate to mobile devices in a sector of the areas covered by base station 102. In communication over forward links 118 and 124, the transmitting antennas of base station 102 may utilize beamforming to improve signal-to-noise ration of forward links 118 and 124 for mobile devices 116 and 122. Also, while base station 102 utilizes beamforming to transmit to mobile devices 116 and 122 scattered randomly through an associated coverage, mobile devices in neighboring cells may be subject to less interference as compared to a base station transmitting through a single antenna to all its mobile devices.

According to an example, system 100 may be a TDD multiple-input multiple-output (MIMO) communication system. Further, system 100 may employ linear precoding to provide channel related feedback (e.g., pertaining to forward links 118 and 124). Pursuant to an illustration, base station 102 may transmit over forward links 118 and 124 to mobile devices 116 and 122. Mobile devices 116 and 122 may estimate the forward link channels and determine explicit feedback to provide to base station 102. Such explicit feedback may relate to portions of the estimated forward link channels. Mobile devices 116 and 122 may provide explicit feedback to base station 102 over reverse links 120 and 126 as well as implicit feedback associated with reverse links 120 and 126. Implicit feedback may be provided to base station 102 due to channel reciprocity associated with system 100 being a TDD system (e.g., since forward links 118 and 124 utilize substantially similar frequency bands as compared to corresponding reverse links 120 and 126); accordingly, the reverse link channel estimated at base station 102 may be substantially similar to the forward link channel (and/or a portion thereof) estimated at mobile devices 116 and/or 122. Base station 102 may obtain channel related information (e.g., associated with forward links 118 and 124) from the explicit and implicit feedback, and the channel related information may be utilized to control subsequent transmission over forward links 118 and 124 (e.g., by performing beamforming to obtain beamforming gain).

Figure 2:
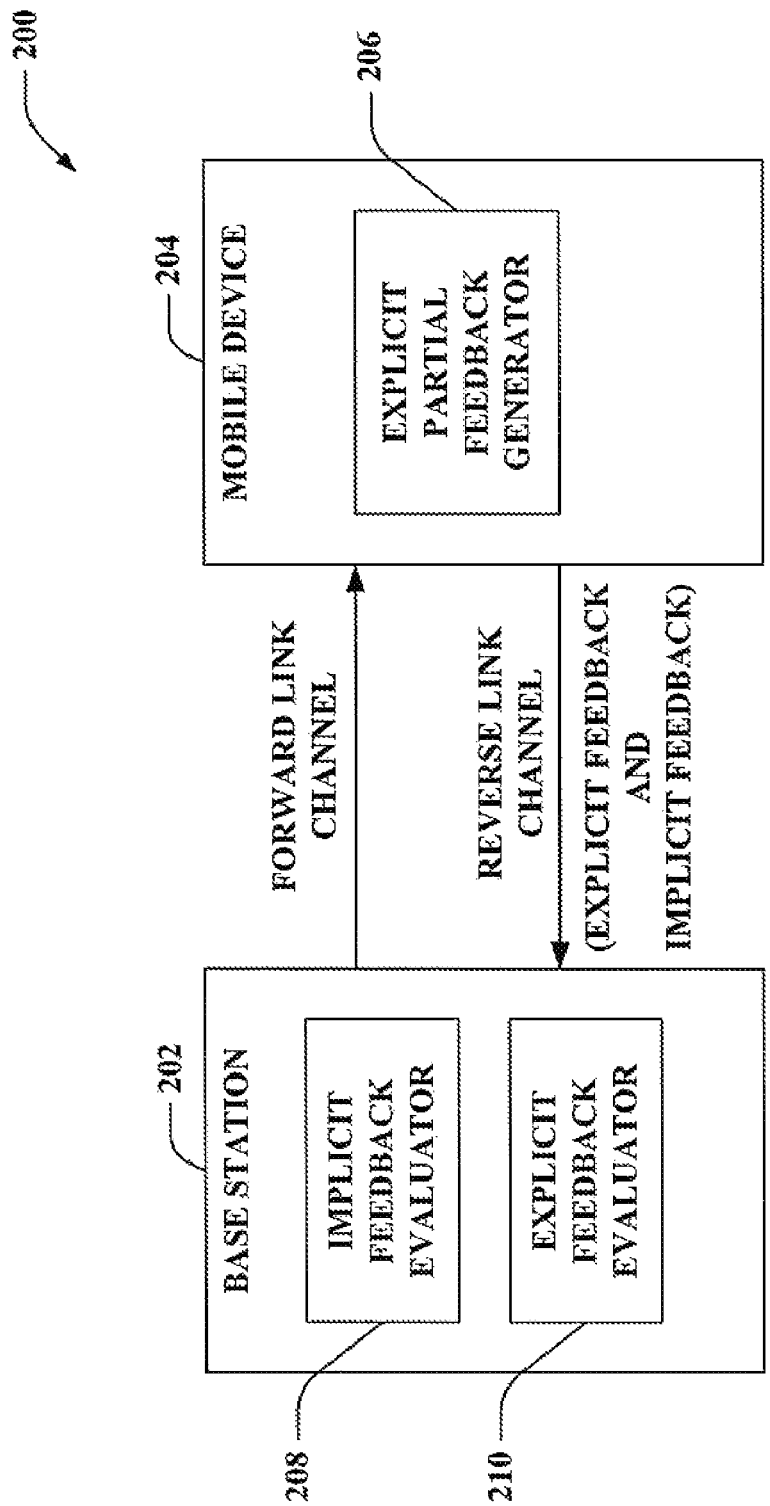
FIG. 2 is an illustration of an example wireless communication system that transfers explicit and implicit feedback related a channel (e.g. forward link channel).

Turning to FIG. 2, illustrated is an example wireless communication system 200 that transfers explicit and implicit feedback related a channel (e.g., forward link channel). System 200 includes a base station 202 that transmits information to a mobile device 204 over a forward link channel; further, base station 202 receives information from mobile device 204 via a reverse link channel. System 200 may be a TDD MIMO system such that the forward link channel and the reverse link channel may utilize a substantially similar frequency range; thus, the reverse link channel may be similar to the forward link channel. However, the claimed subject matter is not limited to employment of a TDD MIMO system. According to an example, mobile device 204 may provide explicit feedback and implicit feedback related to the forward link channel via the reverse link channel and the feedback may be utilized by base station 202 to gain an understanding of the forward link channel, which may be employed to control and/or modify subsequent transmissions over the forward link channel (e.g., employed to facilitate beamforming).

Mobile device 204 may include an explicit partial feedback generator 206 that employs a linear precoding to yield explicit partial feedback related to the forward link channel. For example, mobile device 204 may estimate the forward link channel. Moreover, explicit feedback generator 206 may employ the channel estimate to generate partial explicit feedback related to a portion of the channel (e.g., explicit feedback that may be transferred to base station 202 over the reverse link channel), while communications from mobile device 204 to base station 202 via the reverse link channel may provide implicit feedback associated with a remainder of the channel. Further, base station 202 may include at implicit feedback evaluator 208 that obtains and/or analyzes implicit channel related feedback (e.g., obtained from estimating the reverse link channel, which can be substantially similar to a portion of the forward link channel) and an explicit feedback evaluator 210 that receives and/or examines explicit channel related feedback (e.g., provided from explicit partial feedback generator 206 of mobile device 204, data such as, for example, quantized data, an index, etc. transmitted over the reverse link channel, . . . ). Base station 202 may combine implicit feedback and explicit feedback to gain knowledge of the forward link channel (e.g., entire forward link channel).

According to an example (e.g., where system 200 can be a MIMO system), mobile device 204 may have multiple antennas that may receive information over the forward link channel (e.g., a set of active antennas), while a subset of the multiple antennas (e.g., one, two, etc. of the set of antennas) of mobile devices 204 may be active for communication over the reverse link channel. By utilizing a subset of the antennas for reverse link communication, base station 202 may estimate a portion of the channel related to the subset of antennas employed to communicate over the reverse link channel. The estimate of the portion of the channel may be obtained by implicit feedback evaluator 208. Accordingly, from the point of view of base station 202, base station 202 (and/or implicit feedback, evaluator 208) may have access to a part of the channel (e.g., portion of the forward link channel) because a subset of antennas of mobile device 204 may be active for reverse link channel communication while the remainder of the antennas of mobile device 204 may be inactive. However, base station 202 typically employs feedback related to the entire channel (e.g., to effectuate beamforming), rather than a portion of the channel (e.g., corresponding to particular active antenna(s)). Thus, in addition to implicit feedback obtained via implicit feedback evaluator 208 (e.g., related to one link, more than one link, . . . ), base station 208 may receive explicit feedback related to a remainder of the channel (e.g., explicit feedback related to antennas from the set that may be inactive for reverse link channel communication, explicit feedback associated with disparate link(s) other than link(s) employed in connection with the reverse link channel, . . . ). For example, explicit feedback corresponding to disparate link(s) may be quantized and provided to base station 202. By combining implicit and explicit feedback, base station 202 may obtain an understanding of the entire channel.

Figure 3:
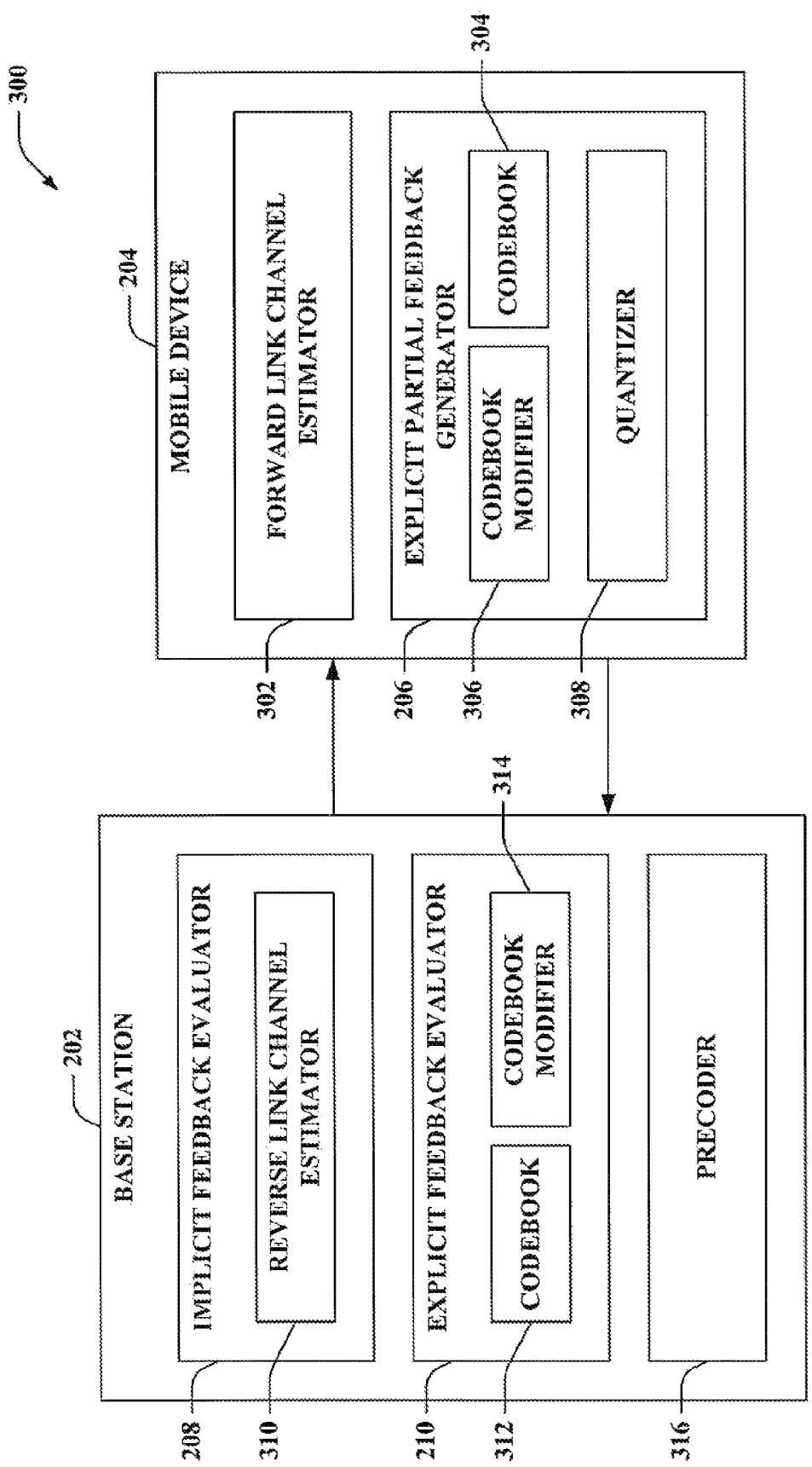
FIG. 3 is an illustration of an example wireless communication system that employs explicit and implicit channel related feedback to modify subsequent transmissions over a channel.

Turning to FIG. 3, illustrated is an example wireless communication system 300 that employs explicit and implicit channel related feedback to modify subsequent transmissions over a channel. System 300 may include base station 202 that communicates with mobile device 204 (e.g., via forward and reverse link channels). Further, system 300 may be a TDD MIMO system. Moreover, mobile device 204 may further comprise explicit partial feedback generator 206 and base station 202 may include implicit feedback evaluator 208 and explicit feedback evaluator 210.

Mobile device 204 may additionally include a forward link channel estimator 302 that estimates a forward link channel from base station 202 to mobile device 204. Forward link channel estimator 302 may generate a matrix H that correspond to the forward link channel, where column of H may relate to transmit antennas of base station 202 and rows of H may pertain to receive antennas at mobile device 204. According to an example, base station 202 may utilize four transmit antennas and mobile device 204 may employ two receive antennas, and thus, forward link channel estimator 302 may evaluate the forward link channel to yield a two-by-four channel matrix H (e.g. where $$H = \begin{bmatrix} h_{11} & h_{12} & h_{13} & h_{14} \\ h_{21} & h_{22} & h_{23} & h_{24} \end{bmatrix};$$

however, it is to be appreciated that the claimed subject matter contemplates utilizing any size (e.g., any number of rows and/or columns) channel matrix H (e.g., corresponding to any number of receive and/or transmit antennas).

Explicit partial feedback generator 206 of mobile device 204 may employ the channel estimate generated by forward link channel estimator 302. Explicit partial feedback generator 206 may include a codebook 304, a codebook modifier 306 and a quantizer 308. Codebook 304 may include a set of N original matrices (where N may be any integer) (e.g., a set of N original unitary matrices). For example, codebook 304 may be designed for identically independently distributed (iid) channels. Further codebook 304 may be $C = \{F_j\}_{j=1}^{N}$, where $F_j$ may be a $M_T \times L$ unitary matrix, $M_T$ may be a number of transmit antennas, and L may be a rank and/or number of spatial multiplexing streams. According to an example, codebook 304 may include 64 original matrices; however, the claimed subject matter is not so limited. Pursuant to a further example, codebook 304 may be substantially similar to codebooks employed in connection with FDD systems; yet, the subject claims are not limited to this example. Additionally or alternatively, codebook 304 may be retained by mobile device 204 (e.g. in memory), while a substantially similar codebook may be stored by base station 202 (as described below).

Pursuant to another example, eigen decomposition of the channel matrix H may be effectuated (e.g., by explicit partial feedback generator 206, forward link channel estimator 302, . . . ) to yield a corresponding unitary matrix (e.g., unitary matrix U), and this unitary matrix may be compared to a set of original unitary matrices from codebook 304 (e.g., by employing quantizer 308) and/or a tailored set of unitary matrices. For instance, the unitary matrix U may include information related to direction of the channel determined from the estimated channel matrix H. Eigen decomposition of the channel matrix H may be effectuated based upon $H^H H = U^H \Lambda V$, where U may be a unitary matrix corresponding to the channel matrix H, $H^H$ may be the conjugate transpose of H, $U^H$ may be the conjugate transpose of U, and $\Lambda$ may be a diagonal matrix.

Moreover, codebook modifier 306 may alter original matrices from codebook 304 based upon implicit channel related information provided via the reverse link channel from mobile device 204 to base station 202 (e.g., which may be a function of active versus inactive antennas of mobile device 204 utilized in connection with the reverse link channel). According to the above example with the two-by-four channel matrix H, the first row may correspond to a first receive antenna of mobile device 204 and the second row may relate to a second receive antenna of mobile device 204. Further, the first receive antenna of mobile device 204 may be utilized for communication over the reverse link channel, while the second receive antenna of mobile device 204 may be inactive. Since system 300 may be a TDD system, the reverse link channel may be substantially similar to a portion of the forward link channel (e.g., corresponding to the first receive antenna of mobile device 204 and/or the first row of the channel matrix H in the aforementioned example) due to reciprocity. Accordingly, codebook modifier 306 may adapt codebook 304 to enable providing explicit feedback related to the second receive antenna of mobile device 204; thus, a set of tailored matrices corresponding to the modified codebook may be obtained.

Quantizer 308 may quantize a portion of the unitary matrix U obtained from the channel matrix H. Pursuant to an illustration, quantizer 308 may quantize links not utilized by mobile device 204 for transmission over the reverse link. Quantizer 308 may perform vector quantization and/or scalar quantization. For example, quantizer 308 may utilize the modified codebook generated by codebook modifier 306 to quantize the portion of the channel. Quantizer 308 may compare the unitary matrix (or a portion thereof) estimated based upon the forward link channel with the set of tailored matrices from the modified codebook to identify a closest tailored matrix from the set. Further, quantizer 308 may determine an index associated with the identified, closest tailored matrix. Moreover, explicit partial feedback generator 206 may feedback the index to base station 202.

According to another example, quantizer 308 may employ scalar quantization where each element of the channel matrix H may be considered independently. Further, codebook 304 and/or codebook modifier 306 need not be employed, for instance. Rather, each element (and/or elements other than those associated with the implicit feedback) may be independently quantized and transmitted to base station 202, and base station 202 may construct a matrix based upon the feedback.

Base station 202 may obtain information (e.g., including the index corresponding to the identified tailored matrix when quantizer 308 employs vector quantization) over the reverse link channel from mobile device 204. Pursuant to an example, the index may comprise 6 bits that may be communicated via the reverse link channel; however, the claimed subject matter contemplates utilizing substantially any number of bits to represent the index. Implicit feedback evaluator 208 may analyze the reverse link channel to identify implicit feedback from mobile device 204. Further, implicit feedback evaluator 208 may include a reverse link channel estimator 310 that may estimate the reverse link channel. Reverse link channel estimator 310 may be substantially similar to forward link channel estimator 302. According to an example system 300 may be a TDD MIMO system; thus, the estimate of the reverse link channel determined by the reverse link channel estimator 310 may be substantially similar to a portion of the estimate of the forward link channel obtained by the forward link channel estimator 302 (e.g., where the portion corresponds to links utilized for the reverse link channel).

Explicit feedback evaluator 210 of base station 202 may analyze explicit feedback (e.g., the obtained index when utilizing vector quantization) received from mobile device 204. Explicit feedback evaluator 210 may further include a codebook 312 and a codebook modifier 314. Codebook 312 may include the same and/or substantially similar set of original matrices as codebook 304. Moreover, codebook modifier 314 may adapt codebook 312 in the same and/or substantially similar manner as codebook modifier 306 adapts codebook 304. For example, codebook modifiers 306 and 314 may adapt codebooks 304 and 312 simultaneously. Additionally, for instance, codebook modifiers 306 and 314 may both know link(s) (e.g., one link, more than one link, . . . ) utilized for the reverse link channel, and hence, may similarly adapt codebooks 304 and 312. Thus, explicit feedback evaluator 210 may receive the index transferred over the reverse link and identify the tailored matrix to which the index refers from the modified codebook. Further, base station 202 may include a precoder 316 that alters subsequent transmissions over the forward link channel based upon an understanding of the forward link channel obtained from the explicit and implicit feedback. For example, precoder 316 may perform beamforming for forward link communications based upon the explicit and implicit feedback.

Codebook modifiers 306 and 314 may define new sets of codebooks 304 and 312 in any manner. These modified codebooks may be utilized by quantizer 308 (e.g., in connection with vector quantization) and/or explicit feedback evaluator 210 (e.g., to identify the matrix that corresponds to the obtained index). According to an example, codebook modifiers 306 and 314 may adapt codebooks 304 and 312 as follows:

$$C_1=\{\text{eigen\_vector}(hh^H+F_j(:,:)F_j(:,:)^H)\}_{j=1}^N$$

Pursuant to this example, $F_j(:,:)$ may denote a submatrix of the matrix $F_j$ and h may correspond to a particular row (for a particular antenna at mobile device 204) of the whole channel matrix H.

In accordance with another example, if both base station 202 and mobile device 204 know a transmit correlation matrix R, codebook modifiers 306 and 314 may adapt codebooks 304 and 312 based at least in part upon the transmit correlation matrix R according to the following:

$$C_2=\{\text{eigen\_vector}(hh^H+R^{1/2}F_j(:,:)F_j(:,:)^H R^{H/2})\}_{j=1}^N$$

In this example, $R^{1/2}$ may be the square root of the matrix R (e.g., $R=R^{1/2}R^{H/2}$).

Codebook modifiers 306 and 314 may additionally or alternatively alter codebooks 304 and 312 as follows, for example:

$$C_3=\{\text{eigen\_vector}(\Omega^{1/2}F_j F_j^H \Omega^{H/2})\}_{j=1}^N$$

or $$C_4=\{\text{proper\_normalizationof}(\Omega^{1/2}F_j))\}_{j=1}^N$$

According to the above examples, $\Omega=hh^H+\alpha R$ where $\alpha$ may be a constant depending on the quality and availability of the channel covariance matrix R.

Moreover, quantizer 308 may effectuate scalar quantization, for example. Pursuant to this example, h may be utilized as one of the basis. Further, quantizer 308 may quantize the projection of the dominant eigenmodes onto h (and/or other randomized orthogonal complement basis). Moreover, mobile device 204 may feedback the projection to base station 202. Additionally, other (possibly randomized) orthogonal complement basis may have more bits on the direction of h.

According to an example, quantizer 308 may utilize the unitary matrix U obtained from eigen decomposition for scalar quantization. Further, a basis may be constructed, and the basis may be shared with both base station 202 and mobile device 204. For instance, the unitary matrix may be U=[U$_1$ U$_2$] and the first column of this unitary matrix may be projected. In accordance with this example, $$U_1 = \sum_{i=0}^{3} \alpha_i e_i$$

where $$\alpha_i = U_1^H e_i \text{ and } e = \frac{h}{\|h\|}.$$

Additionally, base station 202 may obtain α$_i$ (e.g., via communication over the reverse link), which may be the quantized version of feedback. Moreover, base station 202 may construct the following based upon the feedback:

$$\hat{U}_1 = \sum_{i=0}^{3} \alpha_i e_i.$$

It is to be appreciated, however, that the claimed subject matter is not limited to the aforementioned example.

Referring to FIGS. 4-7, methodologies relating to combining implicit and explicit feedback related to forward link channels in TDD MIMO systems are illustrated. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one ore more embodiments.

Figure 4:
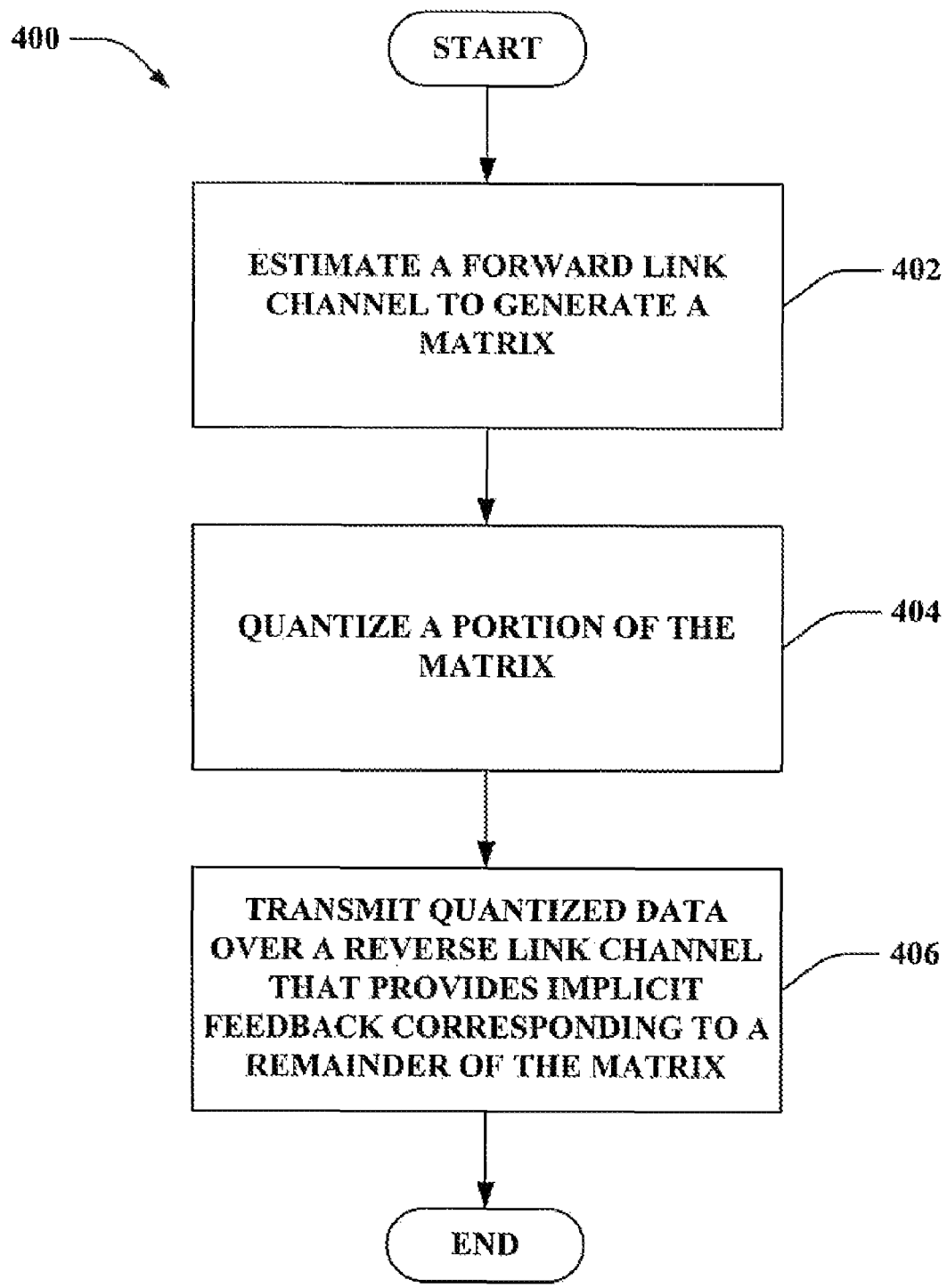
FIG. 4 is an illustration of an example methodology that facilitates generating explicit and implicit feedback related to a forward link channel for linear precoding.

Referring now to FIG. 4, illustrated is a methodology 400 that facilitates generating explicit and implicit feedback related to a forward link channel for linear precoding. At 402, a forward link channel may be estimated to generate a matrix (e.g., channel matrix H, corresponding unitary matrix U, ... ). For example, the forward link channel may be a TDD MIMO channel. Moreover, eigen decomposition of a channel matrix H may be effectuated to yield a unitary matrix U.

At 404, a portion of the matrix may be quantized. According to an example, vector quantization and/or scalar quantization may be employed to quantize the matrix. For instance, the quantized portion of the matrix may correspond to antenna(s) of a mobile device that are inactive for reverse link channel communication. Vector quantization may employ a common codebook known to both a base station and a mobile device; further, the common codebook may be adapted by the base station and the mobile device in a substantially similar manner based at least in part on active link(s) associated with the reverse link channel, a transmit correlation matrix, and so forth. In accordance with another example, scalar quantization may utilize a row h from the channel matrix H as a basis, and quantize a projection of the dominant eigenmodes onto h (and/or other randomized orthognal complement basis). At 406, quantized data may be transmitted over a reverse link channel that provides implicit feedback correspondinag to a remainder of the matrix. Pursuant to an example, the reverse link channel may be substantially similar to a portion of the forward link channel (e.g., since TDD may be employed); therefore, implicit feedback related to a portion of the forward link channel may be derived from the reverse link channel.

Figure 5:
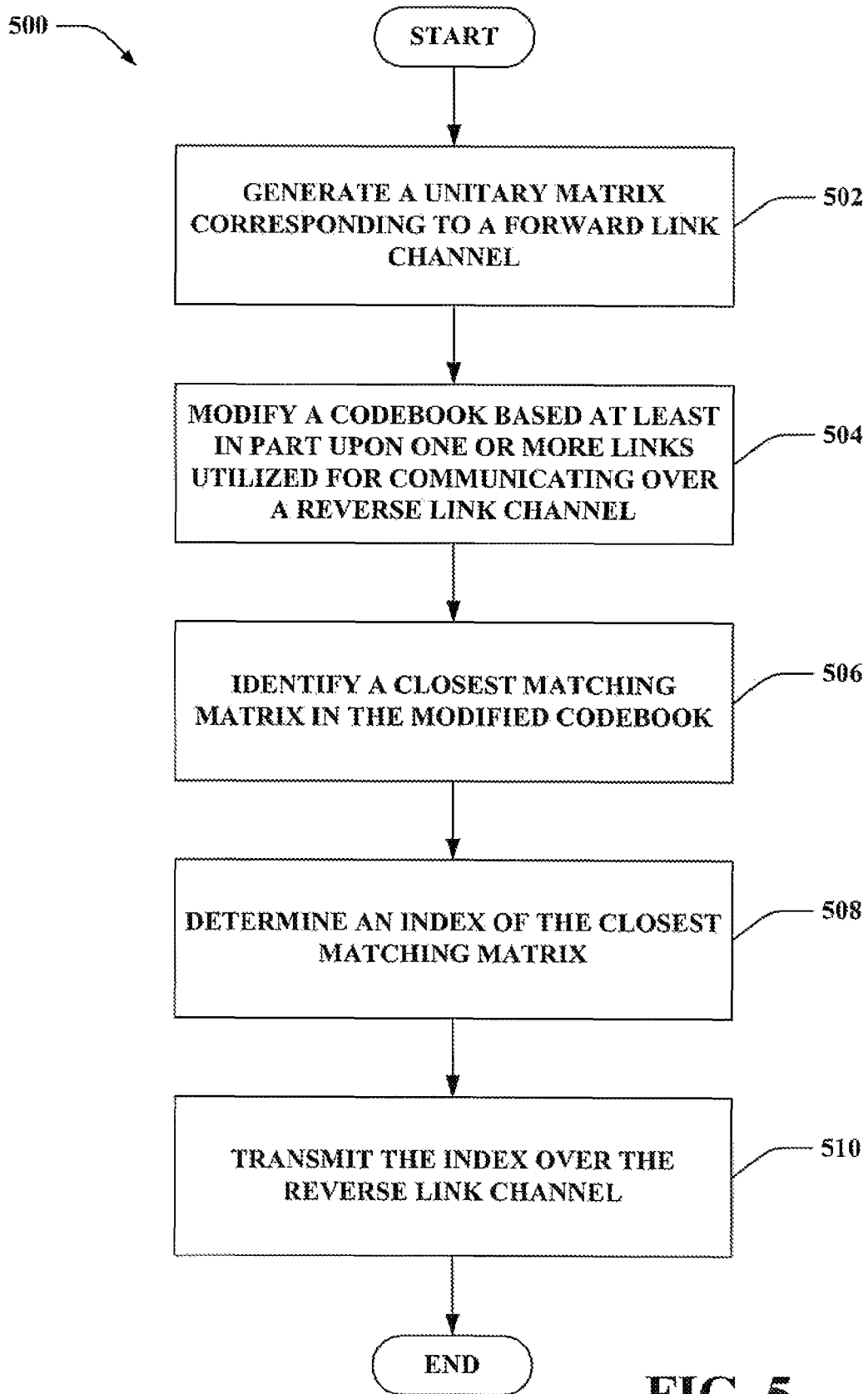
FIG. 5 is an illustration of an example methodology that facilitates modifying a codebook utilized for vector quantization of forward link channel information.

Turning to FIG. 5, illustrated is a methodology 500 that facilitates modifying a codebook utilized for vector quantization of forward link channel information. At 502, a unitary matrix corresponding to a forward link channel may be generated. For instance, the forward link channel nay be estimated to yield a channel matrix H. Further, eigen decomposition may be employed to determine the unitary matrix U. At 504, a codebook may be modified based at least in part upon one or more links utilized for communicating over a reverse link channel. According to an example, the codebook may also be modified as a function of a known transmit correlation matrix R. The codebook may be substantially similar to a codebook retained by a base station. Further, a common understanding with the base station may be utilized to effectuate substantially similar modifications of the codebook.

At 506, a closest matching matrix in the modified codebook may be identified (e.g., by comparing the unitary matrix with adapted matrices in the modified codebook). At 508, an index of the closest matching matrix may be determined. At 510, the index may be transmittetd over the reverse link channel. The index may be M bits, where M may be substantially any integer; thus, explicit forward link channel related feedback may be provided to the base station utilizing the limited reverse link bandwidth. Additionally, implicit feedback may be associated with the reverse link channel.

Figure 6:
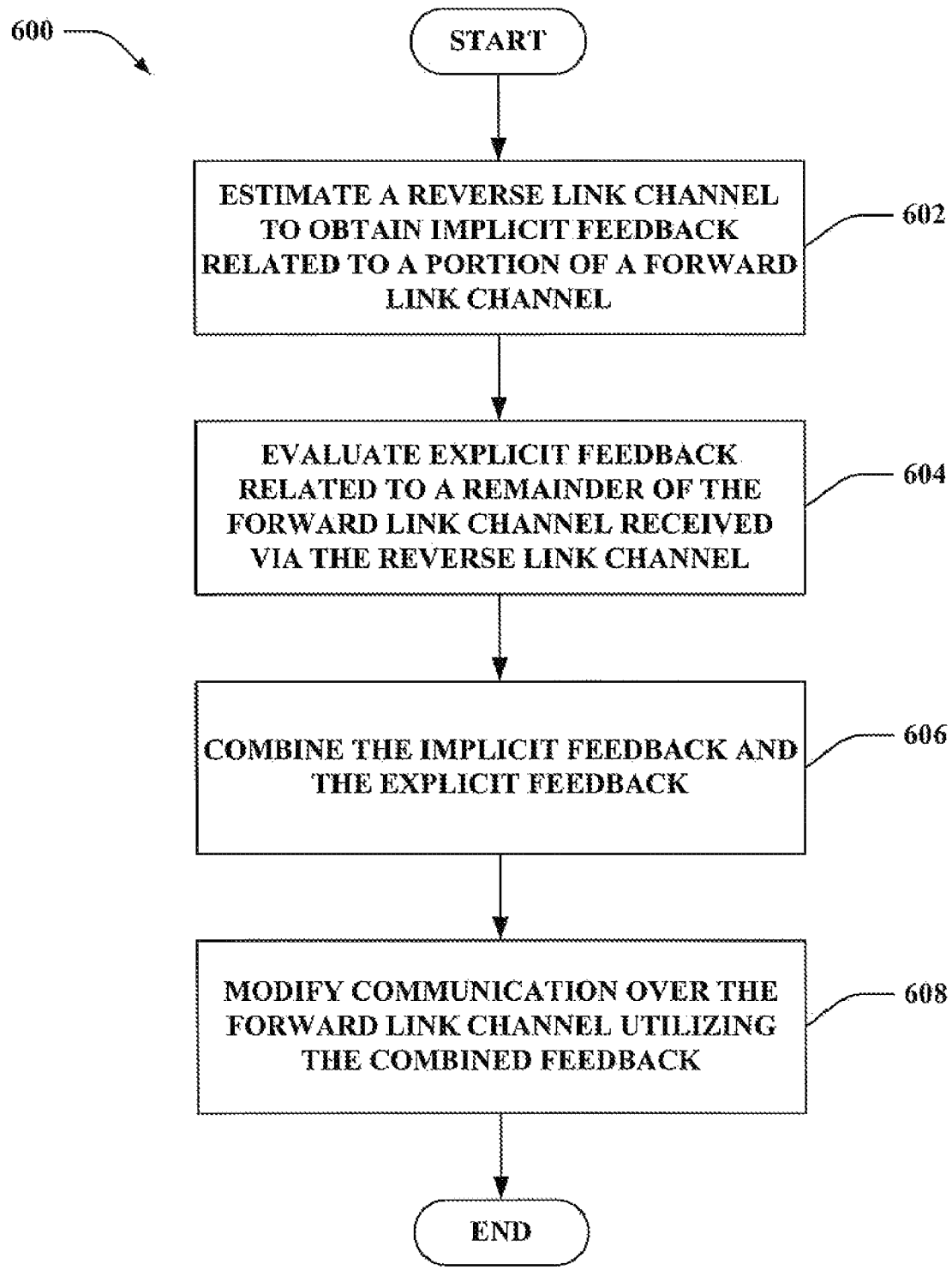
FIG. 6 is an illustration of an example methodology that facilitates utilizing implicit and explicit feedback related to a forward link channel for linear precoding.

With reference to FIG. 6, illustrated is a methodology 600 that facilitates utilizing implicit and explicit feedback related to a forward link channel for linear precoding. At 602, a reverse link channel may be estimated to obtain implicit feedback related to a portion of the forward link channel. For example, by employing TDD, the reverse link channel may be substantially similar to a portion of the forward link channel due to reciprocity. At 604, explicit feedback related to a remainder of the forward link channel received via the reverse link channel may be evaluated. According to an example, the explicit feedback may include information related to scalar quantization and/or vector quantization. At 606, the implicit feedback and the explicit feedback may be combined. At 608, communication over the forward link channel may be modified by utilizing the combined feedback. For example, beamforming may be effectuated by employing the combined feedback.

Figure 7:
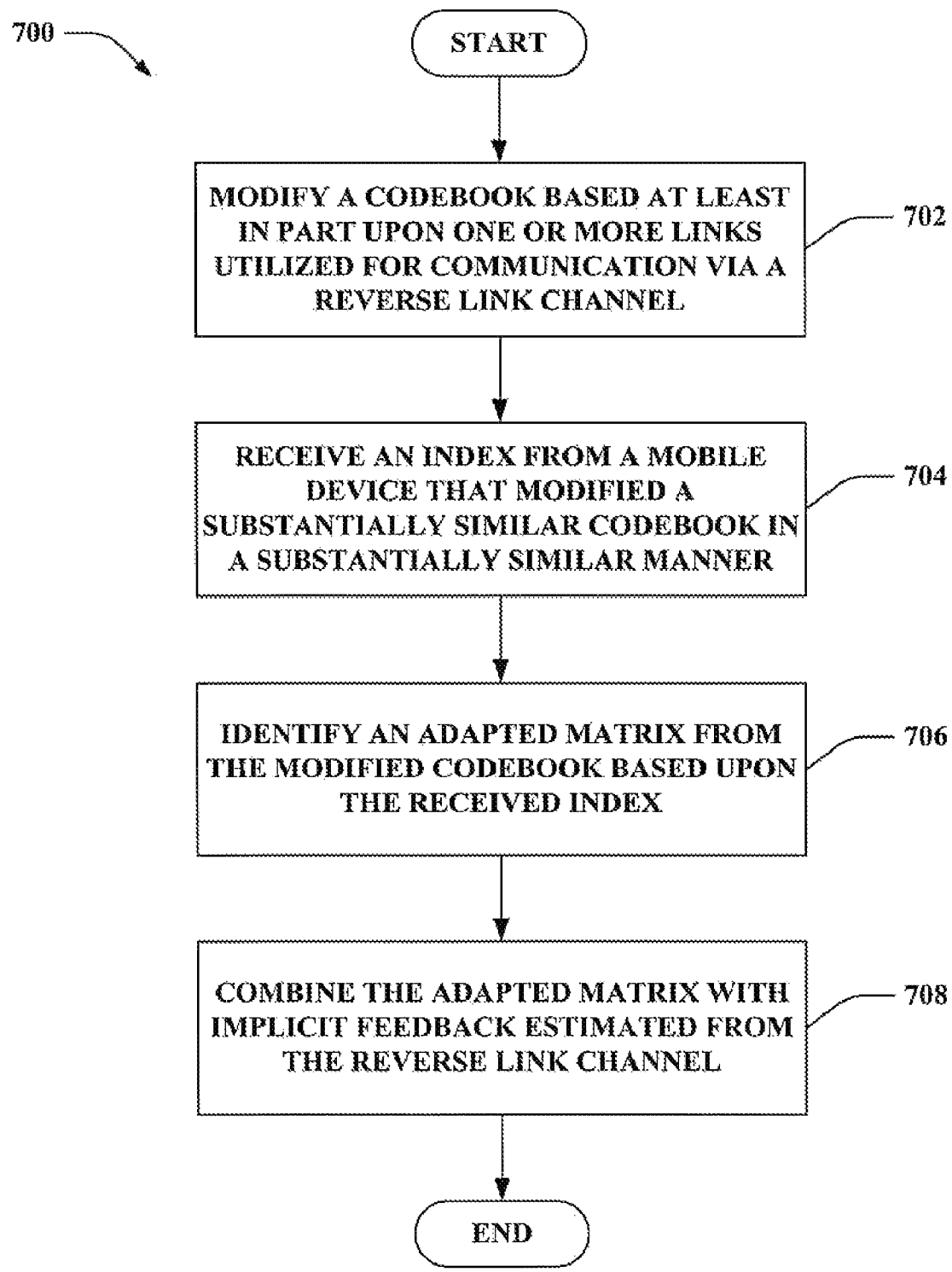
FIG. 7 is an illustration of an example methodology that facilitates modifying a codebook to employ feedback that includes an index received over a reverse link channel.

Now turning to FIG. 7, illustrated is a methodology 700 that facilitates modifying a codebook to employ feedback that includes an index received over a reverse link channel. At 702, a codebook may be modified based at least in part upon one or more links utilized for communication via a reverse link channel. Further, the codebook may be altered based upon transmit correlation related data, for instance. At 704, an index may be received from a mobile device that modified a substantially similar codebook in a substantially similar manner. For example, link(s) employed in connection with the reverse link channel may be known, and both the mobile device and base station may similarly adjust the codebook based upon such information. Moreover, a common version of the original codebook may be retained by both the mobile device and base station. Further, the index may be received via the reverse link channel, which may be estimated to obtain implicit feedback related to a forward link channel. At 706, an adapted matrix from the modified codebook may be identified based upon the received index. At 708, the adapted matrix may be combined with implicit feedback estimated from the reverse link channel.

It will be appreciated that, in accordance with one or more aspects described herein, inferences can be made regarding providing implicit and explicit channel related feedback, evaluating implicit and explicit channel related feedback, utilizing implicit and explicit channel related feedback, etc. As used herein, the term to "infer" or "inference" refers generally to the process of reasoning about or inferring states of the system, environment, and/or user from a set of observations as captured via events and/or data. Inference can be employed to identify a specific context or action, or can generate a probability distributions over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

According to an example, one or more methods presented above can include making inferences pertaining to allocating information for explicit feedback versus information for implicit feedback. By way of further illustration, an inference may be made related to selecting a manner by which to modify an original codebook (e.g., infer known information such as knowledge of link(s) utilized with the reverse link channel, knowledge of a transmit correlation matrix, etc.). It will be appreciated that the foregoing examples are illustrative in nature and are not intended to limit the number of inferences that can be made or the manner in which such inferences are made in conjunction with the various embodiments and/or methods described herein.

Figure 8:
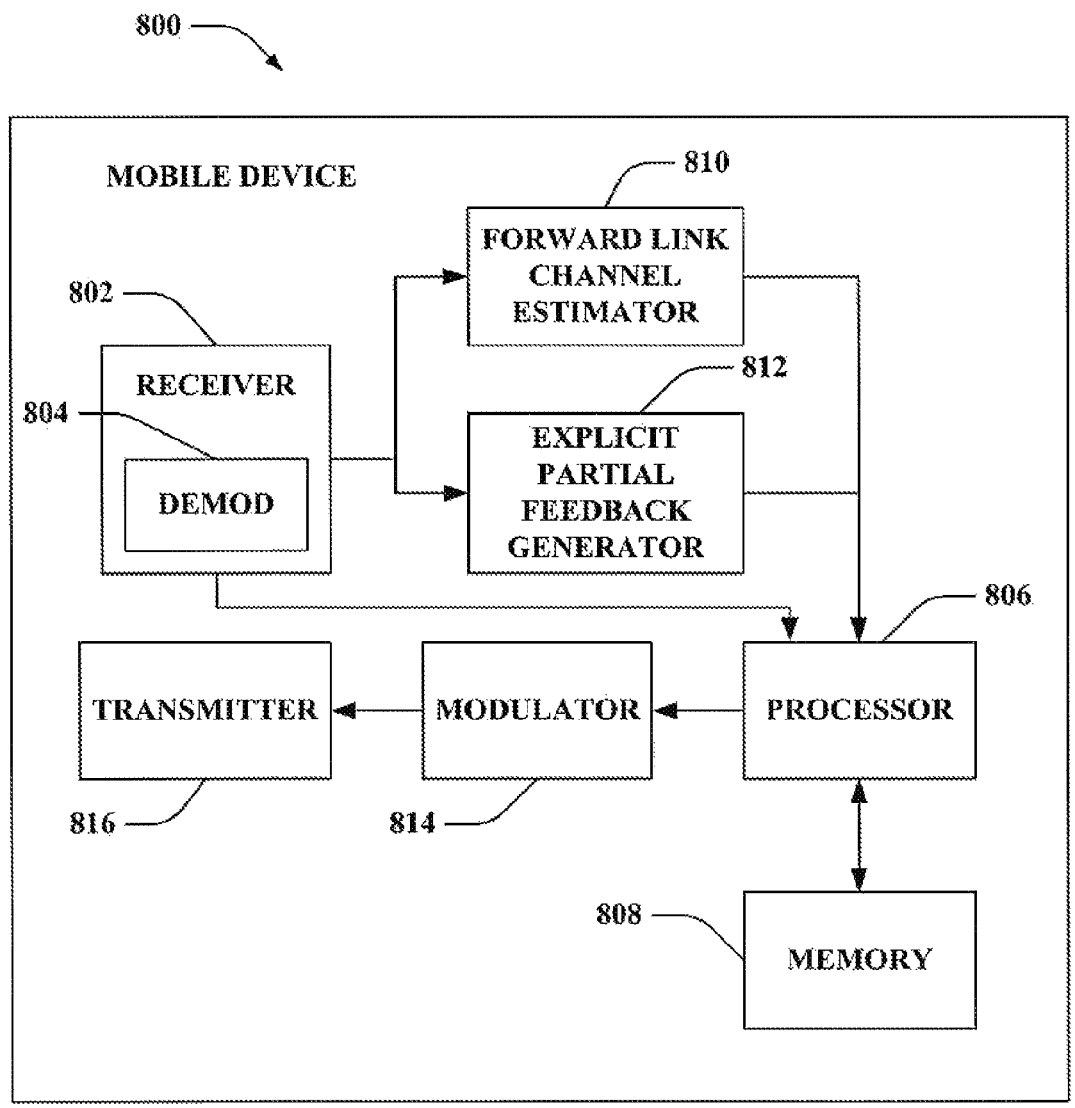
FIG. 8 is an illustration of an example mobile device that facilitates estimating a forward link channel and/or providing feedback (e.g., explicit and implicit) in connection with a TDD MIMO system.

FIG. 8 is an illustration of a mobile device 800 that facilitates estimating a forward link channel and/or providing feedback (e.g., explicit and implicit) in connection with a TDD MIMO system. Mobile device 800 comprises a receiver 802 that receives a signal from, for instance, a receive antenna (not shown), and performs typical actions thereon (e.g., filters, amplifies, downconverts, etc.) the received signal and digitizes the conditioned signal to obtain samples. Receiver 802 can be, for example, an MMSE receiver, and can comprise a demodulator 804 that can demodulate received symbols and provide them to a processor 806 for channel estimation. Processor 806 can be a processor dedicated to analyzing information received by receiver 802 and/or generating information for transmission by a transmitter 816, a processor that controls one or more components of mobile device 800, and/or a processor that both analyzes information received by receiver 802, generates information for transmission by transmitter 816, and controls one or more components of mobile device 800.

Mobile device 800 can additionally comprise memory 808 that is operatively coupled to processor 806 and that may store data to be transmitted, received data, information related to available channels, data associated with analyzed signal and/or interference strength, information related to an assigned channel, power, rate, or the like, and any other suitable information for estimating a channel and communicating via the channel. Memory 808 can additionally store protocols and/or algorithms associated with estimating and/or utilizing a channel (e.g., performance based, capacity base, etc.).

It will be appreciated that the data store (e.g. memory 808) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ES-DRAM), Synchlink DRAM (SLDRAM), and direct Rambus RAM (DRRAM). The memory 808 of the subject systems and methods is intended to comprise, without being limited to, these and any other suitable types of memory.

Receiver 802 is further operatively coupled to a forward link channel estimator 810 that evaluates the forward link channel at mobile device 800. For instance, forward link channel estimator 810 may generate a channel matrix H as described above. Moreover, eigen decomposition may be performed upon the channel matrix H to yield a unitary matrix U. Additionally, an explicit partial feedback generator 812 may utilize a matrix corresponding to the forward link channel (e.g., the channel matrix H, the unitary matrix U, . . . ) to yield explicit feedback that may be transferred (e.g., to a base station). Explicit partial feedback generator 812, for example, may quantize a portion of the matrix (e.g., utilizing vector or and/or scalar quantization). According to an illustration employing vector quantization, a codebook may be stored in memory 808; further, explicit partial feedback generator 812 may utilize processor 806 to modify the codebook to account for characteristics associated with the reverse link channel (e.g., link(s) utilized, correlation, . . . ). The portion of the matrix may correspond to inactive antenna(s) associated with mobile device 800 utilized in connection with transmission over the reverse link channel. Mobile device 800 still further comprises a modulator 814 and a transmitter 816 that transmits the signal to, for instance, a base station, another mobile device, etc. Although depicted as being separate from the processor 806, it is to be appreciated that forward link channel estimator 810, explicit partial feedback generator 812 and/or modulator 814 may be part of processor 806 or a number of processors (not shown).

Figure 9:
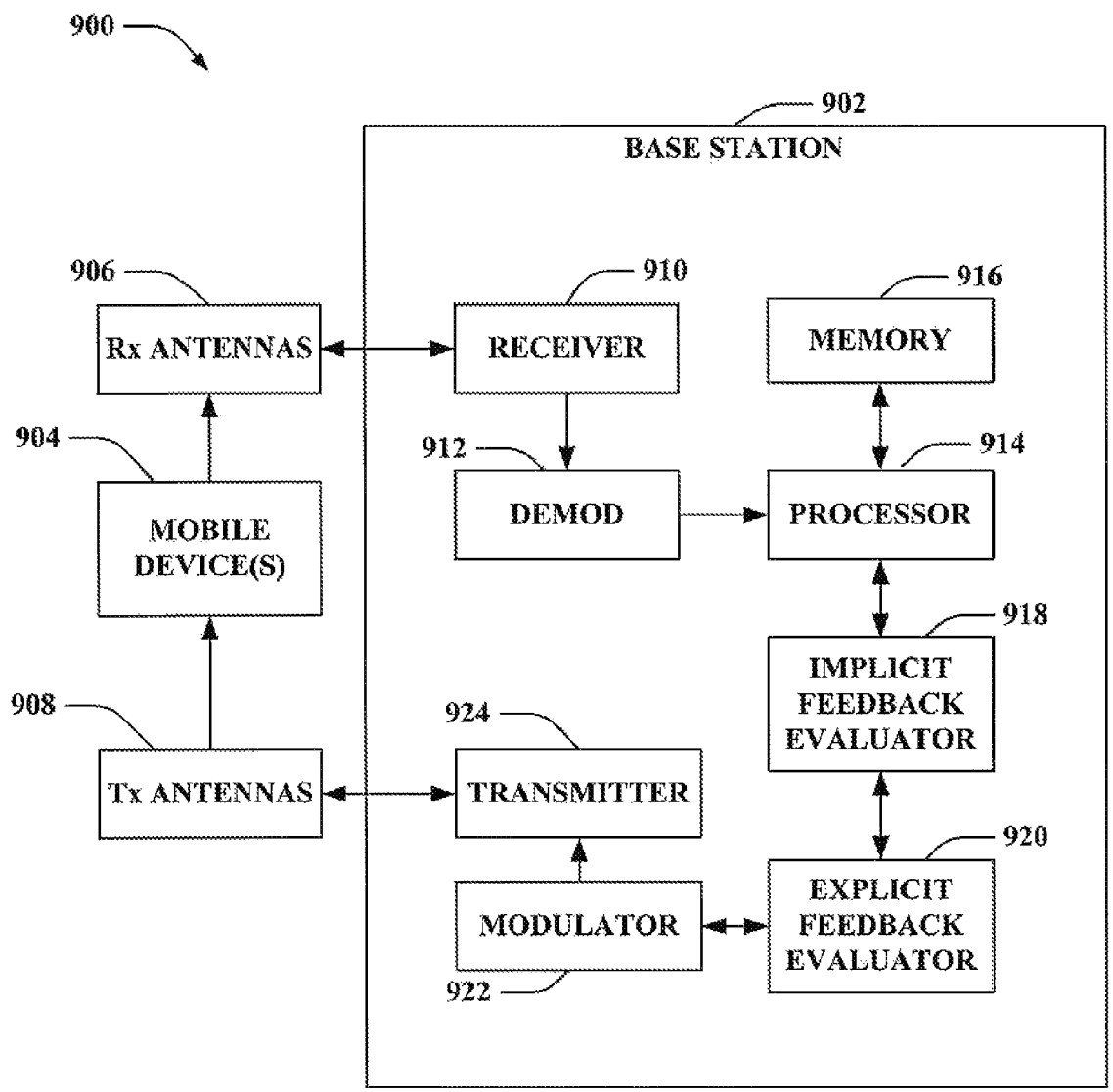
FIG. 9 is an illustration of an example system that facilitates receiving and/or utilizing explicit and implicit feedback related to a forward link channel (e.g., in a TDD MIMO system).

FIG. 9 is an illustration of a system 900 that facilitates receiving and/or utilizing explicit and implicit feedback related to a forward link channel (e.g., in a TDD MIMO system). System 900 comprises a base station 902 (e.g., access point, . . . ) with a receiver 910 that receives signal(s) from one or more mobile devices 904 through a plurality of receive antennas 906, and a transmitter 922 that transmits to the one or more mobile devices 904 through a transmit antenna 908. Receiver 910 can receive information from receive antennas 906 and is operatively associated with a demodulator 912 that demodulates received information. Demodulated symbols are analyzed by a processor 914 that can be similar to the processor described above with regard to FIG. 8, and which is coupled to a memory 916 that stores information related to estimating a signal (e.g., pilot) strength and/or interference strength, data to be transmitted to or received from mobile device(s) 904 (or a disparate base station (not shown)), and/or any other suitable information related to performing the various actions and functions set forth herein. Processor 914 is further coupled to an implicit feedback estimator 918 that evaluates implicit feedback obtained from mobile device(s) 904 via reverse link channel(s). For example, implicit feedback estimator 918 may estimate the reverse link channel(s), which may be similar to a portion of the forward link channel(s), to obtain implicit feedback related to the forward link channel(s).

Implicit feedback evaluator 918 may be further coupled to an explicit feedback evaluator 920 that analyzes explicit feedback received via the reverse link channel(s) from mobile device(s) 904. For example, explicit feedback evaluator 920 may obtain and/or analyze quantized data (e.g., related to vector quantization, scalar quantization, . . . ). Moreover, implicit feedback obtained by implicit feedback evaluator 918 and explicit feedback received by explicit feedback evaluator 920 may be combined to control subsequent transmissions to mobile device(s) 904 (e.g., by employing beamforming, . . . ). Information utilized to control subsequent transmissions may be provided to a modulator 922. Modulator 922 can multiplex the control information for transmission by a transmitter 926 through antenna 908 to mobile device(s) 904. Although depicted as being separate from the processor 914, it is to be appreciated that implicit feedback evaluator 918, explicit feedback evaluator 920 and/or modulator 922 may be part of processor 914 or a number of processors (not shown).

Figure 10:
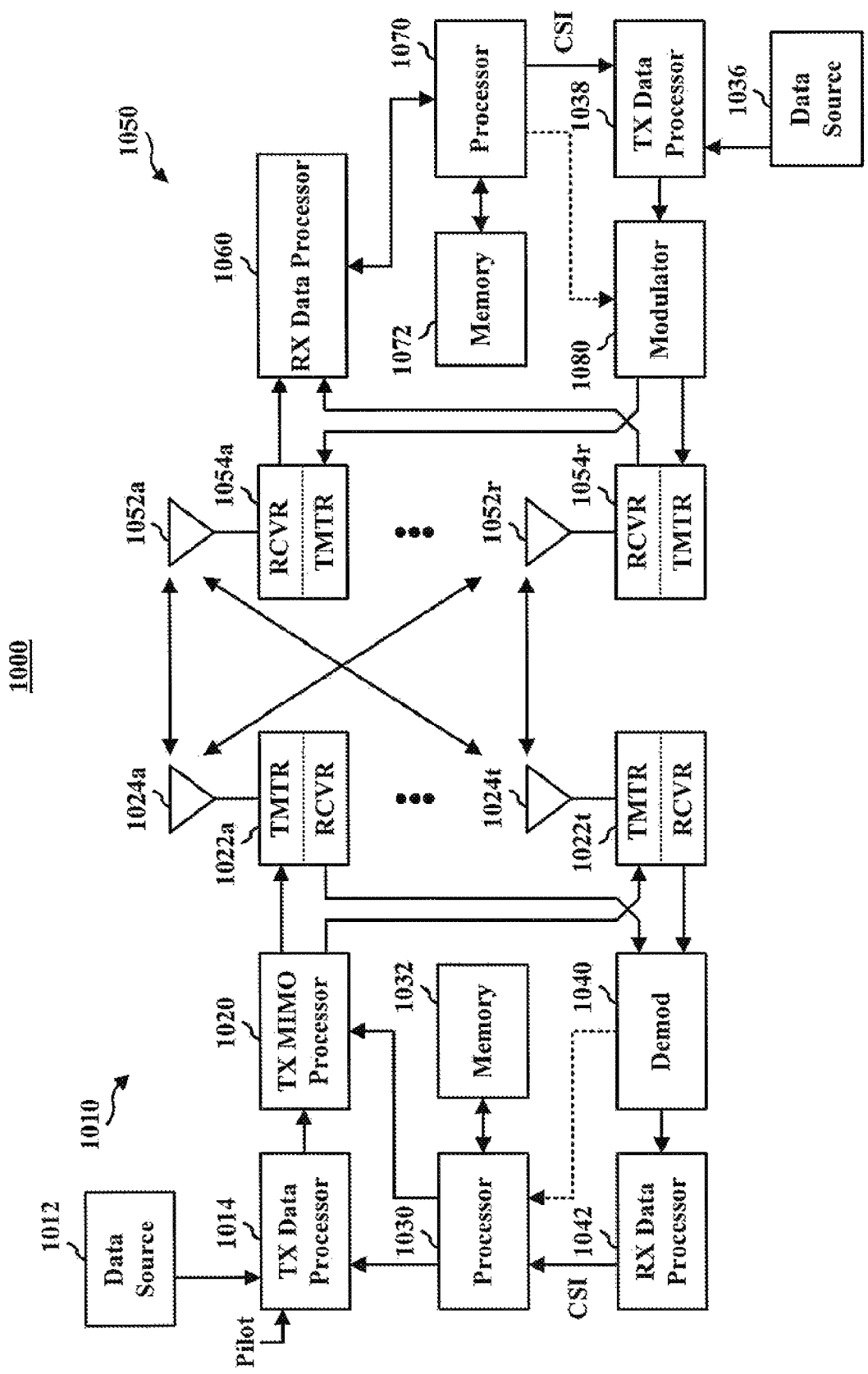
FIG. 10 is an illustration of an example wireless network environment that can be employed in conjunction with the various systems and methods described herein.

FIG. 10 shows an example wireless communication system 1000. The wireless communication system 1000 depicts one base station 1010 and one mobile device 1050 for sake of brevity. However, it is to be appreciated that system 1000 may include more than one base station 1010 and/or more than one mobile device, wherein additional base stations and/or mobile devices may be substantially similar or different from example base station 1010 and mobile device 1050 described below. In addition, it is to be appreciated that base station 1010 and/or mobile device 1050 may employ the systems (FIGS. 1-3 and 8-9) and/or methods (FIGS. 4-7) described herein to facilitate wireless communication there between.

At base station 1010, traffic data for a number of data streams is provided from a data source 1012 to a transmit (TX) data processor 1014. According to an example, each data stream may be transmitted over a respective antenna. TX data processor 1014 formats, codes, and interleaves the traffic data stream based on a particular coding scheme selected for that data stream to provide coded data.

The coded data for each data stream may be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and may be used at mobile device 1050 to estimate channel response. The multiplexed pilot and coded data for each data stream may be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream may be determined by instructions performed or provided by processor 1030.

The modulation symbols for the data streams may be provided to a TX MIMO processor 1020, which may further process the modulation symbols (e.g., for OFDM). TX MIMO processor 1020 then provides $N_T$ modulation symbol streams to $N_T$ transmitters (TMTR) 1022a through 1022t. In various embodiments, TX MIMO processor 1020 applies beamforming weights to the symbols of the data streams and to the antenna from which the symbol is being transmitted.

Each transmitter 1022 receives and processes a respective symbol stream to provide one or more analog signals, and further conditions (e.g., amplifies, filters, and upconverts) the analog signals to provide a modulated signal suitable for transmission over the MIMO channel. Further $N_T$ modulated signals from transmitters 1022a through 1022t are transmitted from $N_T$ antennas 1024a through 1024t, respectively.

At mobile device 1050, the transmitted modulated signals are received by $N_R$ antennas 1052a through 1052r and the received signal from each antenna 1052 is provided to a respective receiver (RCVR) 1054a through 1054r. Each receiver 1054 conditions (e.g., filters, amplifies, and downconverts) a respective signal, digitizes the conditioned signal to provide samples, and further processes the samples to provide a corresponding "received" symbol stream.

An RX data processor 1060 may receive and process the $N_R$ received symbol streams from $N_R$ receivers 1054 based on a particular receiver processing technique to provide $N_T$ "detected" symbol streams. RX data processor 1060 may demodulate, deinterleave, and decode each detected symbol stream to recover the traffic data for the data stream. The processing by RX data processor 1060 is complementary to that performed by TX MIMO processor 1020 and TX data processor 1014 at base station 1010.

A processor 1070 may periodically determine which precoding matrix to utilize as discussed above. Further, processor 1070 may formulate a reverse link message comprising a matrix index portion and a rank value portion.

The reverse link message may comprise various types of information regarding the communication link and/or the received data stream. The reverse link message may be processed by a TX data processor 1038, which also receives traffic data for a number of data streams from a data source 1036, modulated by a modulator 1080, conditioned by transmitters 1054a through 1054r, and transmitted back to base station 1010.

At base station 1010, the modulated signals from mobile device 1050 are received by antennas 1024, conditioned by receivers 1022, demodulated by a demodulator 1040, and processed by a RX data processor 1042 to extract the reverse link message transmitted by mobile device 1050. Further, processor 1030 may process the extracted message to determine which precoding matrix to use for determining the beamforming weights.

Processors 1030 and 1070 may direct (e.g., control, coordinate, manage, etc.) operation at base station 1010 and mobile device 1050, respectively. Respective processors 1030 and 1070 can be associated with memory 1032 and 1072 that store program codes and data. Processors 1030 and 1070 can also perform computations to derive frequency and impulse response estimates for the uplink and downlink, respectively.

It is to be understood that the embodiments described herein may be implemented in hardware, software, firmware, middleware, microcode, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they may be stored in a machine-readable medium, such as a storage component. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, etc.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor via various known as is known in the art.

Figure 11:
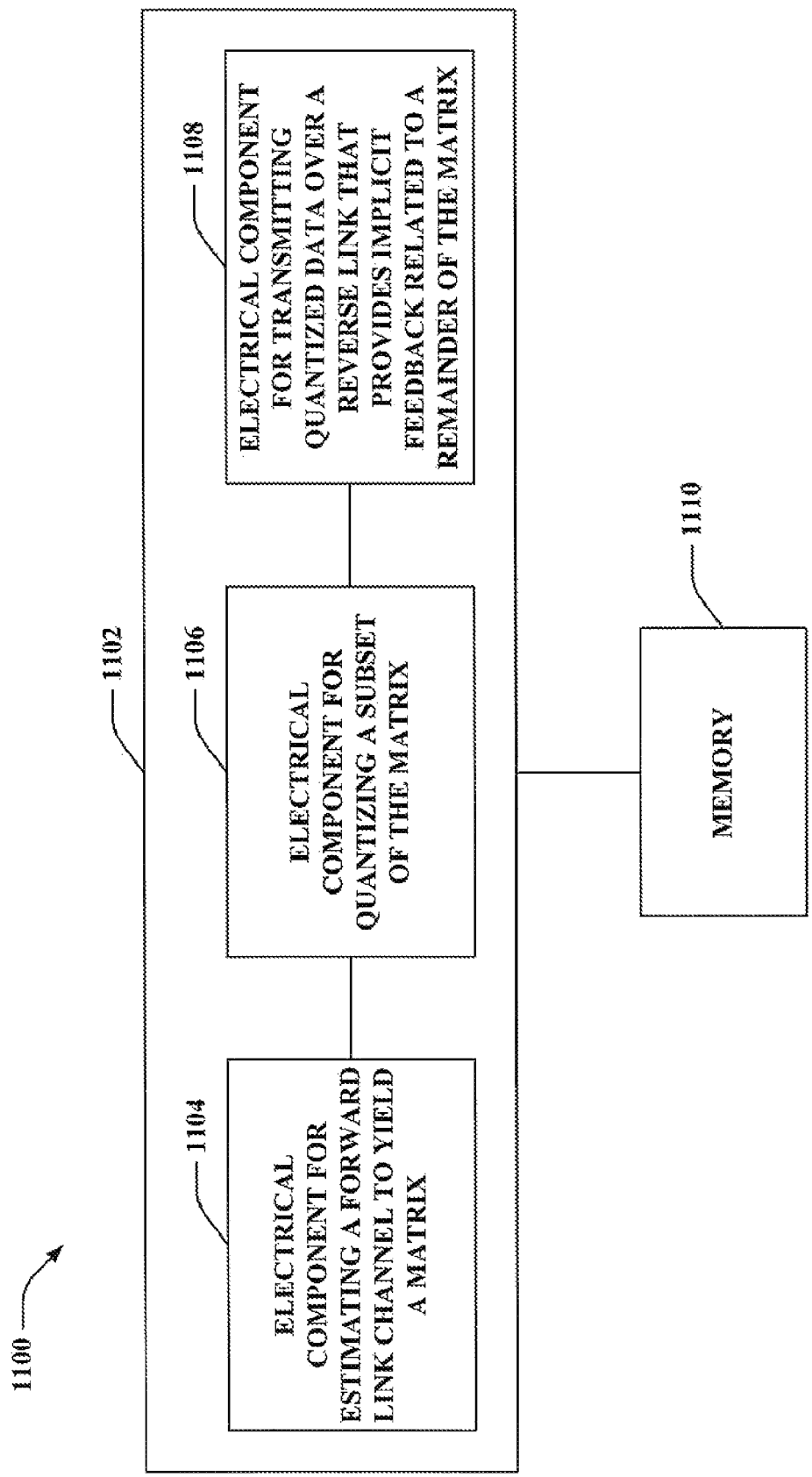
FIG. 11 is an illustration of an example system that generates and/or transfers implicit and explicit feedback related to a forward link channel.

With reference to FIG. 11, illustrated is a system 1100 that generates and/or transfers implicit and explicit feedback related to a forward link channel. For example, system 1100 may reside at least partially within a mobile device. It is to be appreciated that system 1100 is represented as including functional blocks, which may be functional blocks that represent functions implemented by a processor, software, or combination thereof (e.g., firmware). System 1100 includes a logical grouping 1102 of electrical components that may act in conjunction to facilitate generating and/or transferring implicit and explicit feedback. For instance, logical grouping 1102 may include an electrical component for estimating a forward link channel to yield a matrix 1104. For example, the forward link channel may be associated with a TDD MIMO system. Moreover, the matrix may be a channel matrix H and/or a unitary matrix U (e.g., obtained by performing eigen decomposition, . . . ). Further, logical grouping 1102 may comprise an electrical component for quantizing a subset of the matrix 1106. For example, the subset of the matrix may be quantized by employing vector quantization and/or scalar quantization. Additionally, quantized data may provide explicit feedback related to the subset of the matrix. Moreover, logical grouping 1102 may include an electrical component for transmitting quantized data over a reverse link that provides implicit feedback related to a remainder of the matrix 1108. Additionally, system 1100 may include a memory 1110 that retains instructions for executing functions associated with electrical components 1104, 1106, and 1108. While shown as being external to memory 1110, it is to be understood that one or more of electrical components 1104, 1106, and 1108 may exist within memory 1110.

Figure 12:
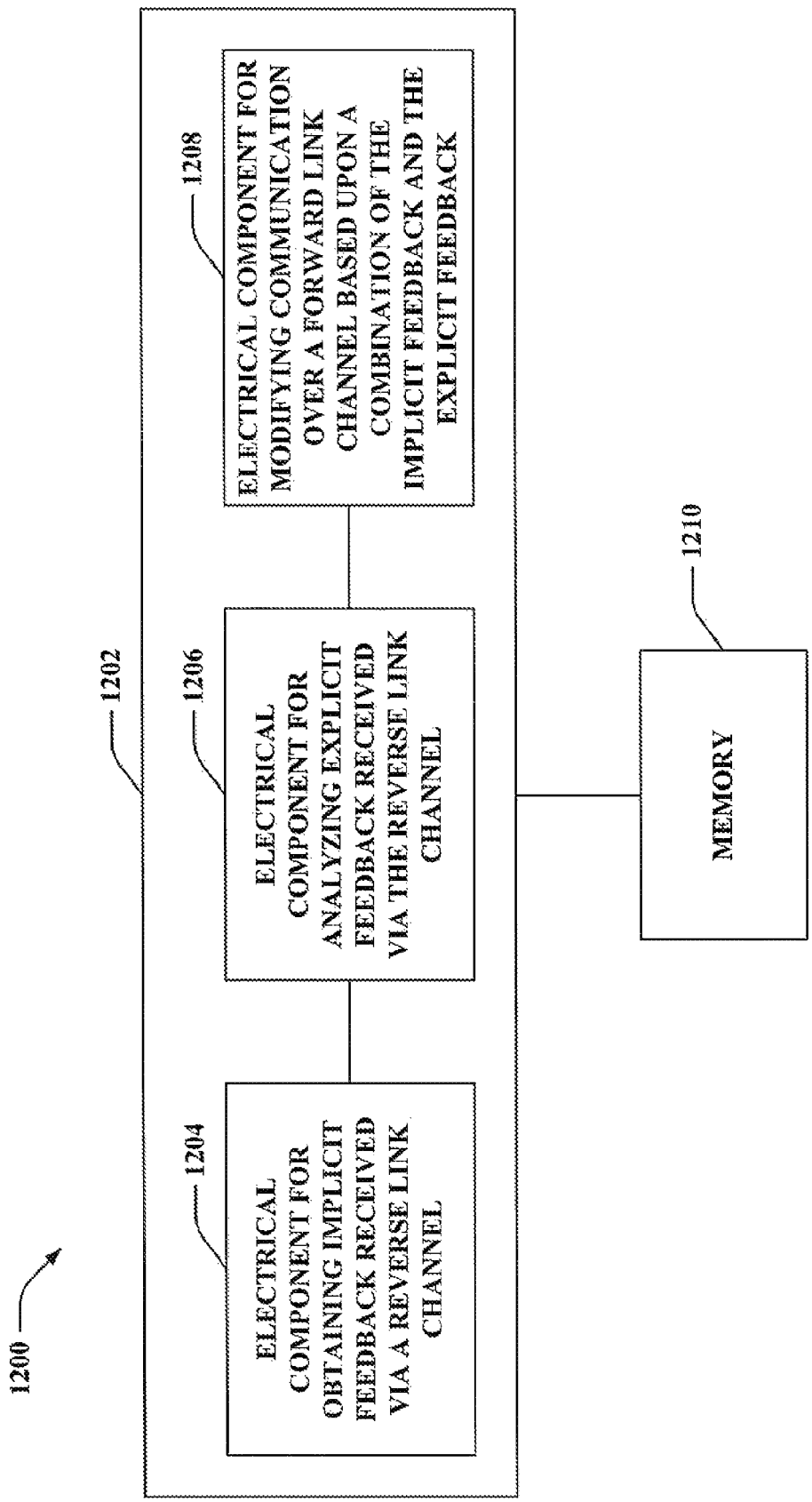
FIG. 12 is an illustration of an example system that utilizes implicit and explicit feedback related to a forward link channel to modify subsequent transmission over the forward link channel.

Turning to FIG. 12, illustrated is a system 1200 that utilizes implicit and explicit feedback related to a forward link channel to modify subsequent transmission over the forward link channel. System 1200 may reside within a base station, for instance. As depicted, system 1200 includes functional blocks that may represent functions implemented by a processor, software, or combination thereof (e.g., firmware). System 1200 includes a logical grouping 1202 of electrical components that facilitate utilizing implicit and explicit feedback. Logical grouping 1202 may include all electrical component for obtaining implicit feedback received via a reverse link channel 1204. For example, implicit feedback may be obtained by estimating the reverse link channel, which may be substantially similar to a portion of a forward link channel (e.g., due to channel reciprocity associated with TDD). Moreover, logical grouping 1202 may include an electrical component for analyzing explicit feedback received via the reverse link channel 1206. According to an example, received quantized data may be evaluated. Further, logical grouping 1202 may comprise an electrical component for modifying communication over a forward link channel based upon a combination of the implicit feedback and the explicit feedback 1208. Additionally, system 1200 may include a memory 1210 that retains instructions for executing functions associated with electrical components 1204, 1206, and 1208. While shown as being external to memory 1210, it is to be understood that electrical components 1204, 1206, and 1208 may exist within memory 1210.

What has been described above includes examples of one or more embodiments. It is, of course, not possible to describe every conceivable combination of components or methodologies for purposes of describing the aforementioned embodiments but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employing as a transitional word in a claim.

What is claimed is:

1. A method that facilitates generating feedback related to a forward link channel for linear precoding, comprising:
    estimating a forward link channel to generate a matrix;
    modifying matrices from a codebook to obtain a set of tailored matrices corresponding to a modified codebook, wherein the matrices from the codebook are modified at least in part based upon implicit channel related information provided via a reverse link channel;
    quantizing a portion of the matrix to yield explicit feedback, wherein quantizing comprises comparing the matrix with the set of tailored matrices from the modified codebook to identify a closest tailored matrix; and
    transmitting quantized data over a reverse link channel that provides implicit feedback corresponding to a remainder of the matrix, wherein the implicit feedback is not identical to the explicit feedback, and wherein the implicit feedback provides information about a part of the matrix other than the quantized portion.

2. The method of claim 1, wherein the matrix is at least one of a channel matrix and a unitary matrix related to the channel matrix.

3. The method of claim 1, wherein the portion of the matrix that is quantized corresponds to one or more inactive antennas associated with reverse link channel communication.

4. The method of claim 1, wherein quantizing the portion of the matrix comprises effectuating scalar quantization by utilizing a row of the matrix as a basis and quantizing a projection of dominant eigenmodes onto that row and other randomized orthogonal complement basis.

5. The method of claim 1, wherein quantizing the portion of the matrix comprises performing vector quantization.

6. The method of claim 5, wherein performing vector quantization comprises:
    modifying a codebook based at least in part upon one or more links utilized for communicating over the reverse link channel;
    determining an index of the closest tailored matrix; and
    transmitting the index over the reverse link channel.

7. The method of claim 6, wherein the matrices from the codebook are modified based upon a transmit correlation matrix.

8. The method of claim 6, wherein the codebook is substantially similar to a codebook employed by a base station to which the index is transmitted.

9. The method of claim 6, wherein the matrices from the codebook are modified in a substantially similar manner as compared to matrices from a codebook employed by a base station to which the index is transmitted.

10. The method of claim 1, wherein the forward link channel and the reverse link channel are associated with a time division duplex (TDD) multiple-input multiple-output (MIMO) system.

11. The method of claim 1, further comprising effectuating eigen decomposition upon the matrix to generate a corresponding unitary matrix, wherein the matrix is a channel matrix.

12. A wireless communications apparatus, comprising:
a memory that retains a codebook and an estimated matrix related to a forward link channel; and
a processor, coupled to the memory, configured to modify matrices from the codebook to obtain a set of tailored matrices corresponding to a modified codebook, wherein the matrices from the codebook are modified based at least in part upon one or more links employed for communicating via a reverse link channel, wherein the processor is also configured to compare a portion of the estimated matrix to the set of tailored matrices in the modified codebook to select a closest tailored matrix, and transmit an index associated with the selected, closest tailored matrix over the reverse link channel.

13. The wireless communications apparatus of claim 12, wherein implicit feedback related to a portion of the forward link channel is provided based upon active antennas utilized for transmitting the index.

14. The wireless communications apparatus of claim 12, wherein the index provides quantized data pertaining to part of the estimated matrix.

15. The wireless communications apparatus of claim 12, wherein the processor transmits the index to a base station that modifies a substantially similar codebook in a substantially similar manner.

16. A wireless communications apparatus for generating and transferring implicit and explicit feedback related to a forward link channel, comprising:
means for estimating a forward link channel to yield a matrix;
means for modifying matrices from a codebook to obtain a set of tailored matrices corresponding to a modified codebook, wherein the matrices from the codebook are modified at least in part based upon implicit channel related information provided via a reverse link channel;
means for quantizing a subset of the matrix, wherein quantizing comprises comparing the matrix with the set of tailored matrices from the modified codebook to identify a closest tailored matrix; and
means for transmitting quantized data over a reverse link channel that provides implicit feedback related to a remainder of the matrix, wherein the implicit feedback is not identical to the explicit feedback, and wherein the implicit feedback provides information about a part of the matrix other than the quantized portion.

17. The wireless communications apparatus of claim 16, wherein the means for quantizing comprises means for performing scalar quantization to generate the quantized data.

18. The wireless communications apparatus of claim 16, further comprising:
means for transmitting an index associated with the closest tailored matrix over the reverse link channel.

19. A non-transitory machine-readable medium having stored thereon machine-executable instructions for:
estimating a forward link channel;
generating a unitary matrix associated with the forward link channel;
modifying matrices from a codebook to obtain a set of tailored matrices corresponding to a modified codebook, wherein the matrices from the codebook are modified at least in part based upon implicit channel related information provided via a reverse link channel;
quantizing a portion of the unitary matrix that corresponds to one or more antennas of a mobile device that are inactive for reverse link channel communication, wherein quantizing comprises comparing the matrix with the set of tailored matrices from the modified codebook to identify a closest tailored matrix; and
transmitting the quantized data over the reverse link channel, wherein the reverse link channel provides implicit feedback corresponding to one or more links associated with one or more active antennas of the mobile device, wherein the implicit feedback is not identical to the explicit feedback, and wherein the implicit feedback provides information about a part of the matrix other than the quantized portion.

20. The non-transitory machine-readable medium of claim 19, further comprising machine-executable instructions for:
transmitting an index that relates to the closest matching matrix via the reverse link channel.

21. The non-transitory machine-readable medium of claim 19, wherein elements of the portion of the unitary matrix are quantized separately based upon scalar quantization.

22. In a wireless communication system, an apparatus comprising:
a processor configured to:
generate a matrix related to an estimated forward link channel;
modify matrices from a codebook to obtain a set of tailored matrices corresponding to a modified codebook, wherein the matrices from the codebook are modified at least in part based upon implicit channel related information provided via a reverse link channel;
quantize a portion of the matrix to yield explicit feedback related to part of the estimated forward link channel, wherein quantizing comprises comparing the matrix with the set of tailored matrices from the modified codebook to identify a closest tailored matrix; and
transmit quantized data over a reverse link channel, wherein the reverse link channel provides implicit feedback related to a remainder of the estimated forward link channel, wherein the implicit feedback is not identical to the explicit feedback, and wherein the implicit feedback provides information about a part of the matrix other than the quantized portion.

23. A method that facilitates utilizing implicit and explicit feedback related to a forward link channel for linear precoding, comprising:
estimating a reverse link channel to obtain implicit feedback related to a portion of a forward link channel;
modifying matrices from a codebook to obtain a set of tailored matrices corresponding to a modified codebook, wherein the matrices from the codebook are modified at least in part based upon implicit channel related information provided via a reverse link channel;
evaluating explicit feedback related to a remainder of the forward link channel received via the reverse link channel, wherein evaluating the explicit feedback comprises receiving an index from a mobile device that modified a substantially similar codebook in a substantially similar manner and identifying an adapted matrix from the modified codebook based upon the received index, and wherein the implicit feedback is not identical to the explicit feedback;
combining the explicit feedback and the implicit feedback; and
modifying communication over the forward link channel utilizing the combined feedback.

24. The method of claim 23, wherein the reverse link channel is substantially similar to a portion of the forward link channel.

25. The method of claim 23, wherein a time division duplex (TDD) multiple-input multiple-output (MIMO) system is employed to communicate via the forward link channel and the reverse link channel.

26. The method of claim 23, wherein the explicit feedback includes quantized data.

27. The method of claim 26, wherein the quantized data is at least one of scalar quantized data and vector quantized data.

28. The method of claim 23, further comprising performing beamforming for a subsequent transmission over the forward link channel by utilizing the combined feedback.

29. A wireless communications apparatus, comprising:
a memory that retains a codebook and an index associated with the codebook received over a reverse link channel; and
a processor, coupled to the memory, configured to modify matrices from the codebook to obtain a set of tailored matrices corresponding to a modified codebook, wherein the matrices from the codebook are modified based at least in part upon one or more links utilized for communication via the reverse link channel, wherein the processor is further configured to determine an adapted matrix from the modified codebook related to the index, and combine explicit feedback associated with the adapted matrix with implicit feedback estimated from the reverse link channel.

30. The wireless communications apparatus of claim 29, wherein the processor modifies the matrices from the codebook in a substantially similar manner as a mobile device modifies matrices from a substantially similar codebook utilized to generate the index.

31. The wireless communications apparatus of claim 29, wherein the processor modifies the matrices from the codebook based upon transmit correlation related data.

32. The wireless communications apparatus of claim 29, wherein the processor adjusts transmission over the forward link channel based upon the combined explicit and implicit feedback.

33. A wireless communications apparatus for utilizing implicit and explicit feedback related to a forward link channel to modify subsequent transmission over the forward link channel, comprising:
means for obtaining implicit feedback received via a reverse link channel;
means for modifying matrices from a codebook to obtain a set of tailored matrices corresponding to a modified codebook, wherein the matrices from the codebook are modified at least in part based upon implicit channel related information provided via a reverse link channel;
means for analyzing explicit feedback received via the reverse link channel, wherein analyzing the explicit feedback comprises receiving an index from a mobile device that modified a substantially similar codebook in a substantially similar manner and identifying an adapted matrix from the modified codebook based upon the received index, and wherein the implicit feedback is not identical to the explicit feedback; and
means for modifying communication over a forward link channel based upon a combination of the implicit feedback and the explicit feedback.

34. The wireless communications apparatus of claim 33, wherein the explicit feedback comprises at least one of scalar quantized data and vector quantized data.

35. The wireless communications apparatus of claim 33, wherein the means for analyzing the explicit feedback comprises:
means for comparing the received index to the set of tailored matrices in the modified codebook.

36. A non-transitory machine-readable medium having stored thereon machine-executable instructions for:
estimating a reverse link channel to obtain implicit feedback corresponding to a portion of a forward link channel;
modifying matrices from a codebook to obtain a set of tailored matrices corresponding to a modified codebook, wherein the matrices from the codebook are modified at least in part based upon implicit channel related information provided via a reverse link channel;
identifying an adapted matrix from the modified codebook;
analyzing explicit feedback received via the reverse link channel, wherein the explicit feedback corresponds to the remainder of the forward link channel, wherein analyzing the explicit feedback comprises receiving an index from a mobile device that modified a substantially similar codebook in a substantially similar manner and identifying an adapted matrix from the modified codebook based upon the received index, and wherein the implicit feedback is not identical to the explicit feedback; and
employing a combination of the implicit feedback and the explicit feedback to modify communication over the forward link channel.

37. The non-transitory machine-readable medium of claim 36, wherein the explicit feedback comprises quantized data.

38. In a wireless communication system, an apparatus comprising:
a processor configured to:
estimate a reverse link channel to determine implicit feedback related to a portion of a forward link channel;
modify matrices from a codebook to obtain a set of tailored matrices corresponding to a modified codebook, wherein the matrices from the codebook are modified at least in part based upon implicit channel related information provided via a reverse link channel;
evaluate explicit feedback related to a remainder of the forward link channel received via the reverse link channel, wherein evaluating the explicit feedback comprises receiving an index from a mobile device that modified a substantially similar codebook in a substantially similar manner and identifying an adapted matrix from the modified codebook based upon the received index, and wherein the implicit feedback is not identical to the explicit feedback; and
combine the implicit feedback and the explicit feedback.

* * * * *